Dec. 18, 1928.
J. N. HELTZEL
1,695,653
AUTOMOBILE BUMPER
Original Filed Oct. 28, 1925   2 Sheets-Sheet 1
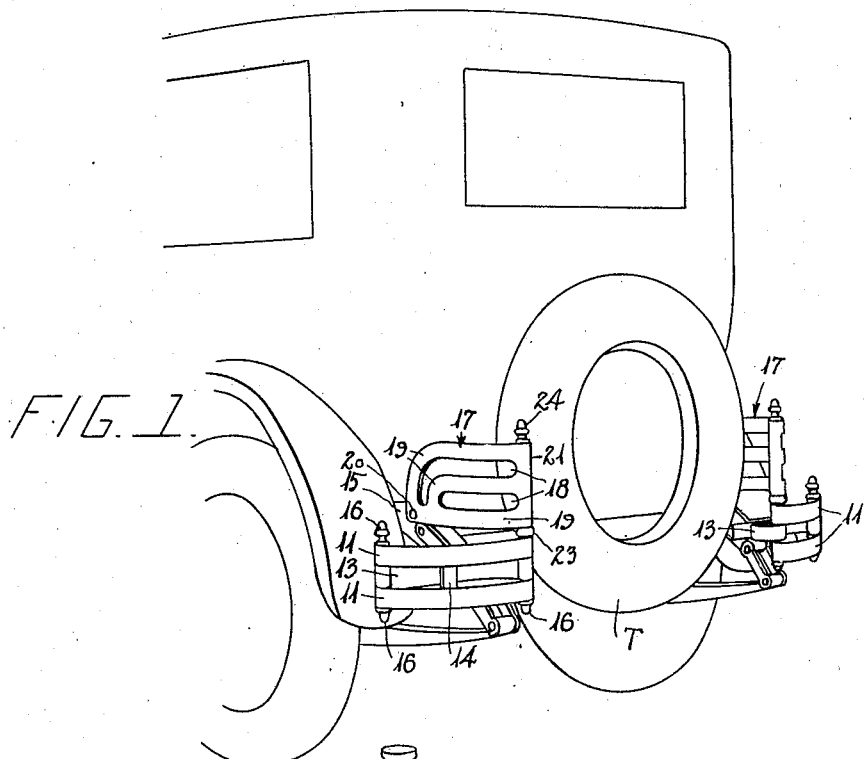
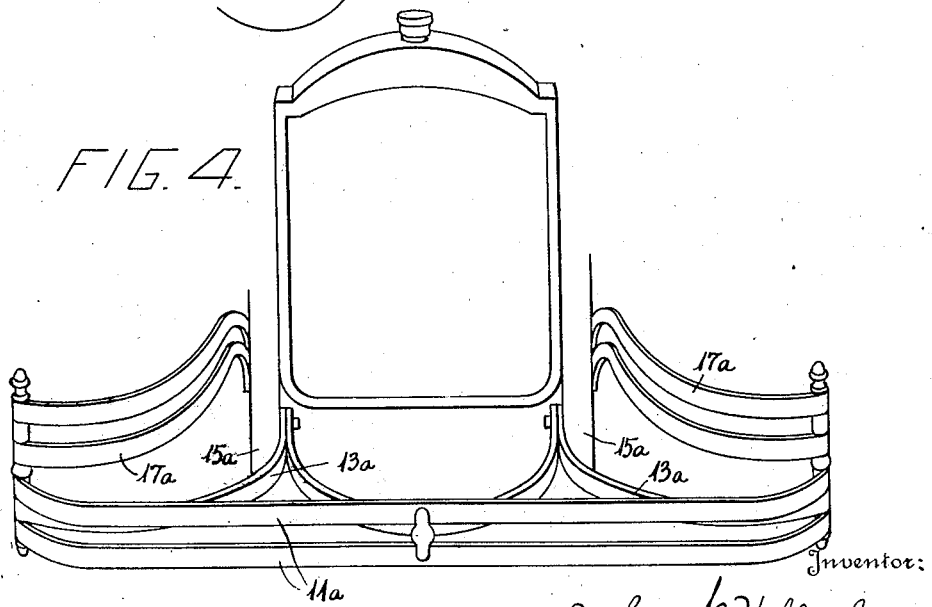
Inventor:
John N. Heltzel
By Monroe E. Miller
Attorney.

Dec. 18, 1928.
J. N. HELTZEL
1,695,653
AUTOMOBILE BUMPER
Original Filed Oct. 28, 1925   2 Sheets-Sheet 2
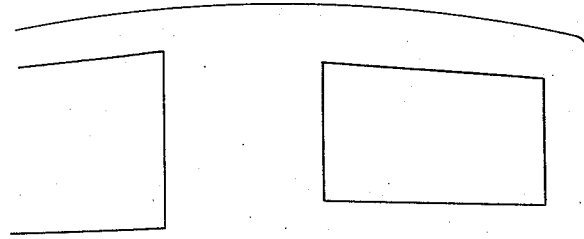
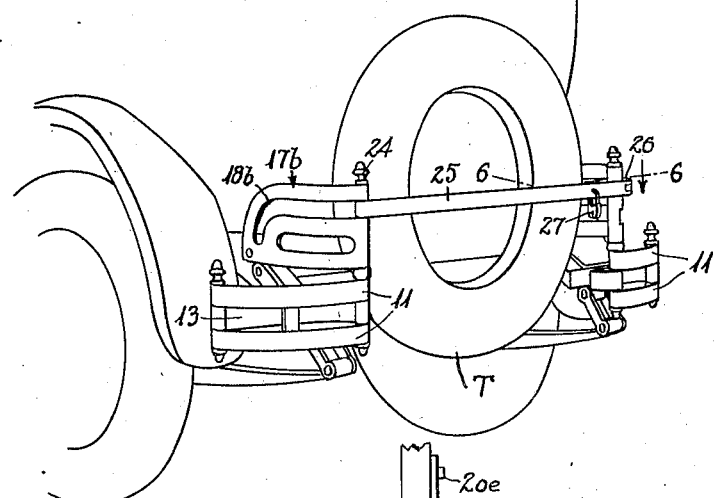
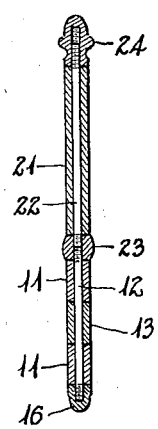
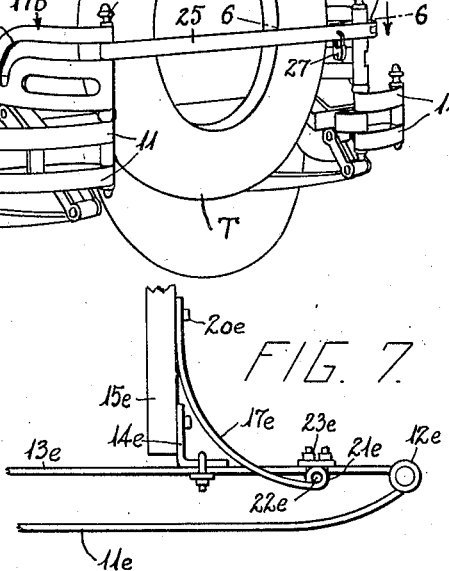
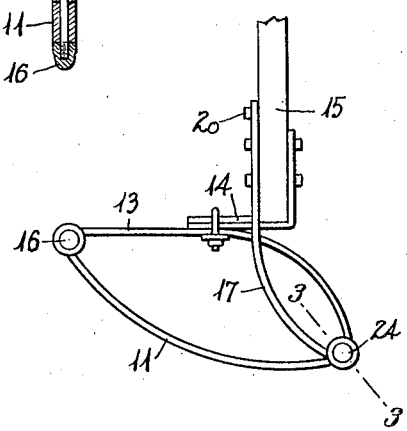
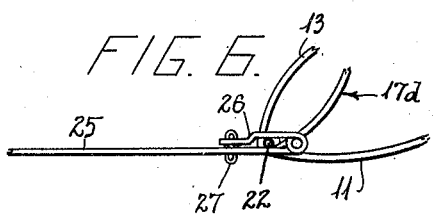

Patented Dec. 18, 1928.

1,695,653

UNITED STATES PATENT OFFICE.

JOHN N. HELTZEL, OF WARREN, OHIO.

AUTOMOBILE BUMPER.

Application filed October 28, 1925, Serial No. 65,358. Renewed November 28, 1927.

The present invention relates to automobile bumpers, and has for its object the provision of an attachment for ordinary or well-known bumpers, in order to brace the bumper, add to the protection afforded, and improve the appearance of the automobile.

Another object of the invention is the provision of a simple and inexpensive attachment to be fastened to an ordinary automobile bumper and the frame or chassis of the automobile to brace the bumper and increase the protection, as well as lending an ornate appearance.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a perspective view illustrating a pair of the attachments used on the rear bumpers of an automobile.

Fig. 2 is a plan view of the left side bumper and attachment.

Fig. 3 is a vertical section on the line 3—3 of Fig. 2.

Fig. 4 is a perspective view showing a pair of modified form of attachments as applied to the front bumper of an automobile.

Fig. 5 is a perspective view illustrating a modification.

Fig. 6 is a section on the line 6—6 of Fig. 5.

Fig. 7 is a fragmentary plan view illustrating a further modification.

The well-known or ordinary bumpers shown in Figs. 1, 2 and 3 are located behind the rear wheels at opposite sides of the spare tire T which is mounted at the rear end of the vehicle body. Each bumper of the pair comprises the vertically spaced curved bumper bars 11 having their ends formed into loops or eyes embracing vertical hinge rods 12, and an oppositely curved supporting bar 13 has its ends also formed into eyes or loops embracing the rods 12 between the bars 11. The bar 13 is secured by means of a bracket or clamp 14 or other suitable means to the rear terminal of the side beam or frame member 15 of the chassis. Cap nuts 16 are threaded on the ends of the rods 12 to hold the bars 11 and 13 assembled. This type of bumper is already on the market, and such bumpers are used to protect the rear wheel fenders without constituting an obstruction in rear of the spare tire T in order that such tire may be readily removed and replaced.

The attachments are used in pairs, one at each side, so that they are furnished in rights and lefts. Each attachment comprises a plate 17 of resilient sheet metal of suitable thickness, preferably about the same thickness as the resilient bumper bars 11. This plate 17 may be made in different sizes and shapes to suit different bumpers and automobiles. As shown, the plate 17 is formed with slots 18 defining the bars 19, so that the plate has the appearance of being composed of bars, and this also adds to the appearance of the device.

This attachment may be fabricated by forming and assembling a plurality of bars giving the desired appearance.

One end of the plate 17 overlaps the beam or frame member 15 and is secured thereto by a bolt 20 or other fastening element, to support the corresponding end portion of the plate in an upstanding position in a longitudinal vertical plane. The opposite end of the plate is bent into a sleeve 21 located above the inner hinge joint of the bumper, said hinge joint being spaced or offset inwardly from the longitudinal line of the frame member or beam 15, as seen in Fig. 2. The rear or outer terminal of the plate 17 is curved inwardly to bring the sleeve 21 above the inner hinge joint of the bumper. A hinge rod 22 extends through the sleeve 21, and a nut 23, which may be a turn-buckle, is screw-threaded on the adjacent ends of the rods 12 and 22, as seen in Fig. 3. A cap nut 24 is threaded on the upper end of the rod 22 to hold the sleeve 21 thereon. With this arrangement, the nut 24 which is ordinarily on the rod 12 may be removed and the rod 22 attached to the rod 12 by means of the nut or turn-buckle 23, using the nut 24 on the upper end of the rod 22. However, if desired, the rods 12 and 22 may constitute a single part or rod extending through the sleeve 21 and the sleeves or eyes of the bars 11 and 13.

The plate 17 being curved or bent will be capable of being flexed with the bumper when the bumper strikes obstructions, and the plate 17 will also serve as a brace between the bumper and vehicle frame. Part of the strains will be taken up by the plate 17, thereby assisting in the cushioning action of the bumper, as well as tending to hold the bumper in its proper position. The plates or attachments 17 being located at opposite sides of the spare tire T will also afford protection to the rear end of the vehicle body, as well as improving the appearance of the automobile. The plates or members 17 define side walls between which the tire or other object is disposed, thereby defining a rack to receive and protect a tire, trunk or other object mounted on the rear of the machine. As shown, the attachments are used above the horizontal plane of the bumpers, so as to be offset vertically with reference to the bumpers.

Fig. 4 illustrates the attachments 17ª, composed of either slotted plates or bars, as applied to the front bumper of an automobile. The bumper comprises the vertically spaced bars 11ª extending across the front end of the automobile, and supporting bars 13ª secured to the beams or frame members 15ª and hingedly connected with the ends of the bars 11ª, similar to the hinge joints of the bumpers hereinbefore described. The rear ends of the attachments 17ª are secured to the frame members 15ª and the forward ends of the attachments are curved outwardly along diverging lines, and the front terminals of the attachments are mounted on the hinge joints of the bumper in substantially the same manner as hereinbefore described. As shown in Figs. 1 and 2, the outer ends of the attachments are curved inwardly, while as shown in Fig. 4 the outer ends of the attachments are curved outwardly to the hinge joints of the bumper.

Fig. 5 illustrates the use of an anti-theft device for the spare tire T. Thus, a bar 25 hingedly engages the rod 22 of one attachment, the slot 18ᵇ of said attachment 17ᵇ being extended to said rod. The opposite terminal of the bar 25 has suitable means to engage the other attachment 17ᵈ. Thus, as shown, the bar 25 swings across the rod 22 of the attachment 17ᵈ, and a piece 26 is hinged to the free end of the bar 25 to swing across the opposite side of said rod 22, and said bar and piece have apertures to receive a padlock 27. Thus, the bar 25 extending across the spare tire T will prevent said tire from being removed from its holder (not shown), unless the padlock 27 is removed to enable the bar 25 to be swung away from the tire.

Fig. 7 illustrates another modification. The bumper comprises the bumper and supporting bars 11ᵉ and 13ᵉ hingedly connected at each end, as at 12ᵉ. The bar 13ᵉ is attached to each beam or frame 15ᵉ of the automobile chassis by a bracket or clamp 14ᵉ. The inner end of the attachment 17ᵉ is secured, as at 20ᵉ, to the frame member 15ᵉ, and is curved outwardly, the outer end of said attachment being formed with the sleeve 21ᵉ receiving the vertical rod 22ᵉ which is secured by a suitable clamp 23ᵉ to the bar 13ᵉ at a point spaced inwardly from the corresponding hinge joint 12ᵉ. Thus, instead of the attachment extending to the end or hinge joint 12ᵉ of the bumper, as seen in Fig. 4, the attachment extends only part way, and the rod 22ᵉ, as suggested in Fig. 7, may be attached to the bumper independently of the hinge joint of the bumper, although the rod 22ᵉ provides a hinge joint between the bumper and attachment, it being understood that style as shown in Figs. 4 and 7 may be readily used in rear of the automobile.

Having thus described the invention, what is claimed as new is:—

1. The combination with an automobile bumper and its means for attachment to the frame of an automobile, of an attachment offset vertically out of the horizontal plane of the bumper comprising a plate adapted to be secured at one end to the frame and having means at its other end connected to the bumper.

2. The combination with an automobile bumper and its means for attachment to the frame of an automobile, of an attachment offset vertically out of the horizontal plane of the bumper comprising a plate adapted to be secured at one end to the frame and having means at its other end hingedly connected with said bumper.

3. The combination with an automobile bumper and its means for attachment to the frame of an automobile, of an attachment offset vertically from the horizontal plane of the bumper and comprising a resilient plate adapted to be secured at one end to the frame, said plate having its opposite terminal portion curved and provided with means connected to the bumper.

4. The combination with an automobile bumper and its means for attachment to the frame of an automobile, of an attachment offset vertically from the horizontal plane of the bumper and comprising a resilient plate adapted to be secured to one end to the frame, said plate having its opposite terminal portion curved and provided with means hingedly connected with said bumper.

5. The combination with an automobile bumper and the means for attaching it to the automobile frame, of a vertical rod connected to said bumper and extending vertically beyond the horizontal plane of the bumper, and an attachment offset vertically relatively to said plane and adapted to be secured at one end to said frame, and having its other end provided with means embracing said rod.

6. The combination with an automobile bumper and the means for attaching it to the automobile frame, of an attachment comprising a plate, one end of which is adapted to be secured to said frame, and the other end of said plate being disposed above and connected to said bumper.

7. The combination with an automobile bumper and the means for attaching it to the automobile frame, of an attachment comprising a plate, one end of which is adapted to be secured to said frame, and the other end of said plate being disposed above and having a hinge joint connection with said bumper.

8. The combination with an automobile bumper and the means for attaching it to the automobile frame, of an attachment comprising a resilient plate, one end of which is adapted to be secured to said frame, the other end portion of said plate being curved in a direction transversely of the automobile and being disposed above and connected to said bumper.

9. The combination with an automobile bumper and the means for attaching it to the automobile frame, of an attachment comprising a resilient plate, one end of which is adapted to be secured to said frame, the other end portion of said plate being curved in a direction transversely of the automobile and being disposed above and hingedly connected with said bumper.

10. The combination with an automobile bumper and the means for attaching it to the automobile frame, of a rod secured to and projecting upwardly from said bumper, and an attachment comprising a plate, one end of which is adapted to be secured to said frame, the other end of said plate having means embracing the rod above the bumper.

11. The combination with an automobile bumper and the means for attaching it to the automobile frame, of a vertical rod carried by the bumper and extending upwardly from the bumper, and a resilient plate, one end of which is adapted to be secured to said frame, the other end portion of the plate being curved transversely of the automobile and having a sleeve embracing said rod.

12. The combination with an automobile bumper structure and its means for attachment to one end of an automobile frame, of a pair of attachments having means for connection to said structure and frame and adapted to serve as side walls disposed at opposite sides of an object mounted on the end of the automobile.

13. The combination with an automobile bumper structure and its means for attachment to one end of an automobile frame, of a pair of attachments having means for connection to said structure and frame and adapted to be disposed at opposite sides of an object mounted on the end of the automobile, and means connecting said attachments to extend across said object.

14. The combination with an automobile bumper structure and its means for attachment to the frame of an automobile at one end thereof, of a secondary bumper adapted to be mounted on said bumper at said end of the automobile and having means for attachment to said frame at said end of the automobile.

15. The combination with a pair of bumpers having means for attachment to the frame of an automobile at one end thereof, of a secondary bumper adapted to be mounted on each of said bumpers at said end of the automobile having means for attachment to said frame at said end of the automobile.

16. The combination with a pair of bumpers having means for attachment to the frame of an automobile, of an attachment mounted on each of said bumpers having means for attachment to said frame, said attachments serving as side walls between which an object may be mounted at the corresponding end of the automobile, and means for connecting said attachments to extend across said object.

In testimony whereof I hereunto affix my signature.

JOHN N. HELTZEL.